United States Patent
Wong

(10) Patent No.: US 12,056,776 B2
(45) Date of Patent: Aug. 6, 2024

(54) ELECTRONIC PROCTOR SYSTEMS AND METHODS FOR ASSEMBLING AND MONITORING REMOTE STUDENT INTERACTIONS

(71) Applicant: TURION CORPORATION, Cupertino, CA (US)

(72) Inventor: Ze Wei Wong, Cupertino, CA (US)

(73) Assignee: TURION CORPORATION, Cupertino, CA (US)

( * ) Notice: Subject to any disclaimer, the term of this patent is extended or adjusted under 35 U.S.C. 154(b) by 0 days.

(21) Appl. No.: 18/221,567

(22) Filed: Jul. 13, 2023

(65) Prior Publication Data

US 2023/0360148 A1    Nov. 9, 2023

Related U.S. Application Data

(63) Continuation of application No. 18/085,910, filed on Dec. 21, 2022, now Pat. No. 11,741,554, which is a
(Continued)

(51) Int. Cl.
*G06Q 10/10*     (2023.01)
*G06Q 50/00*     (2012.01)
(Continued)

(52) U.S. Cl.
CPC .............. *G06Q 50/01* (2013.01); *H04W 4/08* (2013.01); *H04L 65/403* (2013.01)

(58) Field of Classification Search
None
See application file for complete search history.

(56) References Cited

U.S. PATENT DOCUMENTS 11,436,690 B1    1/2022  Wong
11,593,895 B1    2/2023  Wong
(Continued)

FOREIGN PATENT DOCUMENTS

WO    PCT/US23/60995    1/2022

OTHER PUBLICATIONS

U.S. Appl. No. 18/085,910, filed Jan. 25, 2022, Wong—owned by applicant.
(Continued)

*Primary Examiner* — Natisha D Cox
(74) *Attorney, Agent, or Firm* — Brian S. Boyer; SYNDICATED LAW, PC

(57) ABSTRACT

Methods and systems for assembling and monitoring remote students in an online academic environment are provided, the monitoring including an electronic proctor that determines whether meeting criteria are met. The method includes a use of the system to filter a subpopulation from a population stored in a database, the population including students in the self-paced, online environment. The subpopulation can be selected to meet a first set of criteria for a grouping of students for a group interaction. Additional criteria can be added to provide control over the selection of students for the subpopulation and, thus, control over the design of groups to provide a desired group profile for the group interaction. The methods and systems provided can align and group students of the self-paced, online environment for a group interaction, as well as electronically proctor and otherwise monitor and control the interaction.

20 Claims, 6 Drawing Sheets

Related U.S. Application Data continuation of application No. 17/866,310, filed on Jul. 15, 2022, now Pat. No. 11,593,895, which is a continuation of application No. 17/583,509, filed on Jan. 25, 2022, now Pat. No. 11,436,690.

(51) Int. Cl.
*H04W 4/08* (2009.01)
*H04L 65/403* (2022.01)

(56) References Cited

U.S. PATENT DOCUMENTS

| | | | |
|---|---|---|---|
| 11,595,788 B2 | 2/2023 | Traylor et al. | |
| 2005/0131827 A1 | 6/2005 | Bantz et al. | |
| 2013/0117368 A1* | 5/2013 | Dozier | G06F 16/337 709/204 |
| 2014/0038725 A1 | 2/2014 | Mizrahi et al. | |
| 2014/0372159 A1* | 12/2014 | Bain | G06N 20/00 705/7.12 |
| 2015/0089399 A1* | 3/2015 | Megill | H04L 12/1813 715/753 |
| 2016/0004990 A1 | 1/2016 | Sankar et al. | |
| 2016/0217431 A1 | 1/2016 | Pinard et al. | |
| 2017/0046127 A1* | 2/2017 | Fletcher | G06Q 10/06393 |
| 2017/0046374 A1* | 2/2017 | Fletcher | G06F 3/04842 |
| 2018/0226157 A1 | 2/2018 | Blanshard et al. | |
| 2019/0295186 A1 | 9/2019 | Zhou | |

OTHER PUBLICATIONS

Written opinion and search report for PCT/US23/60995, Wong—owned by Applicant, Jan. 25, 2022.

AARP. Travel. Cruise Vacation Guide. https://www.aarp.org/travel/vacation-ideas/cruises/ (Downloaded Apr. 28, 2022).

Dot Esports. Dota 2 MMR and ranking system explained. Dec. 15, 2021. https://dotesports.com/dota-2/news/dota-2-mmr-and-ranking-system-explained (Downloaded Apr. 22, 2022).

Gamerant. Warzone: How Skill Based Matchmaking Works. Brackets and Team Dynamics. Updated Dec. 2, 2021. https://gamerant.com/warzone-skill-based-matchmaking-works/#:~:text=Skill%2Dbased%20matchmaking%20will%20take,playing%20against%20less%20skilled%20opponents (Downloaded Apr. 22, 2022).

NCSA. Case Western Reserve University Football Program Information. https://www.ncsasports.org/athletic-scholarships/football/ohio/case-western-reserve-university (Downloaded Apr. 28, 2022).

\* cited by examiner

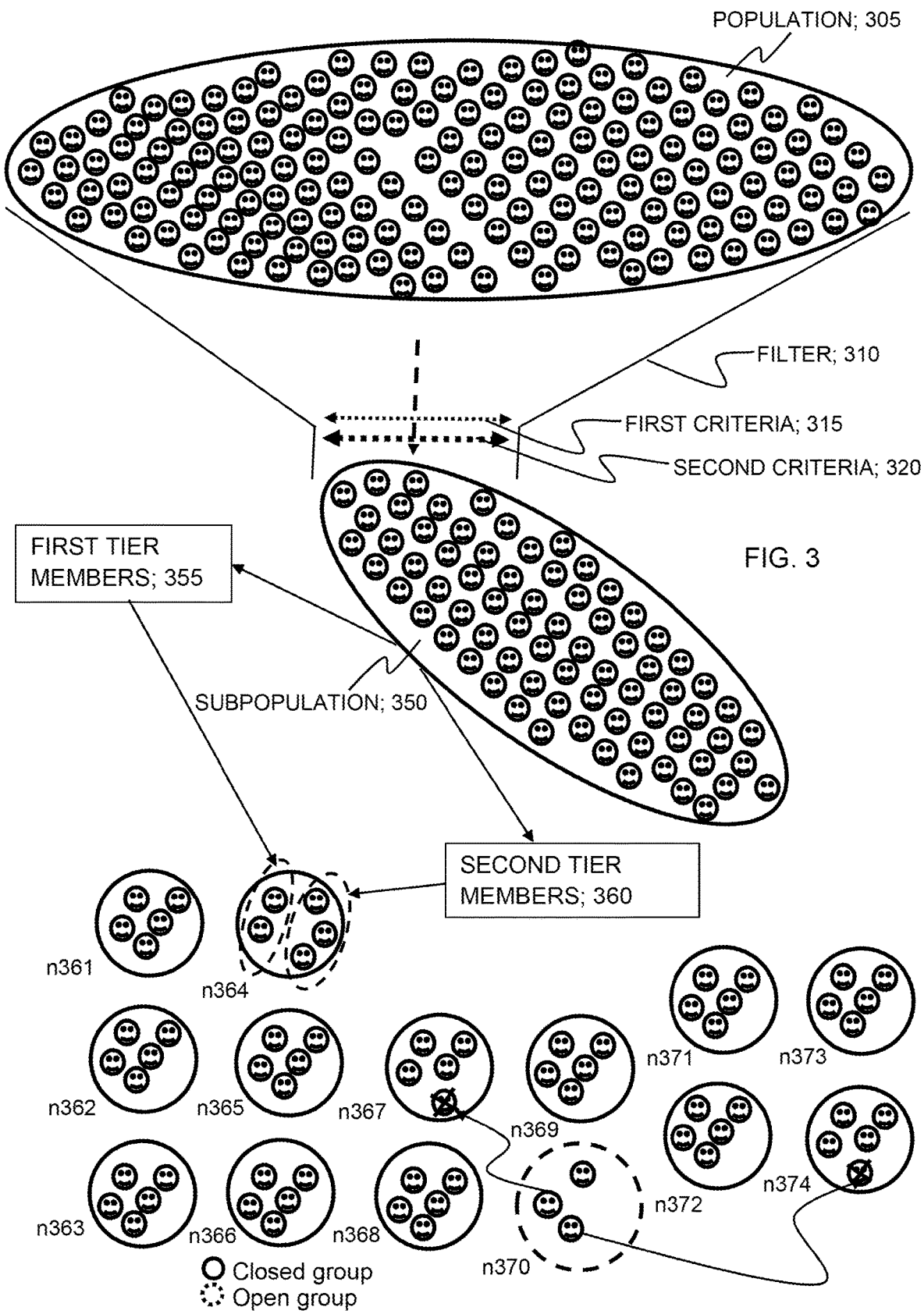

ELECTRONIC PROCTOR SYSTEMS AND METHODS FOR ASSEMBLING AND MONITORING REMOTE STUDENT INTERACTIONS

CROSS-REFERENCE TO RELATED APPLICATIONS

This application is a continuation of U.S. patent application Ser. No. 18/085,910, filed Dec. 21, 2022, which is a continuation of U.S. patent application Ser. No. 17/866,310, filed Jul. 15, 2022, now U.S. Pat. No. 11,593,895, which is a continuation of U.S. patent application Ser. No. 17/583,509, filed Jan. 25, 2022, now U.S. Pat. No. 11,436,690, each of which is hereby incorporated herein by reference in it's entirety.

BACKGROUND

Field of the Invention

The systems and methods taught herein are generally directed to a system and method for assembling a group for a group interaction in a self-paced, online environment.

Description of the Related Art

The technological advancement of the internet, VOIP, and increases in data flow rate and streaming technologies have changed the world. One of the main advances is the ability to communicate "virtually", in real time, where members of a group can communication from remote locations. A major benefit is the ability to meet without having to physically be present, as it allows for interaction that doesn't include the time, cost, and risk of physical traveling constraints. It also allows for unique groups of persons to meet, where such meetings would not otherwise be possible due to the time, cost, and risk constraints of the members having to physical traveling to a mutual location.

Although the teachings provided here can apply to any group interaction, the academic world has had "online education" for quite some time, thanks to the internet. Online education has given much flexibility to students that may not otherwise be able to get the education they desire, from the source they desire, without the cost, time, and risk constraints of having to physically travel to meet with educators. Some online education programs offer flexibility on start date and rate of progress, a self-paced program, and this results in students progressing under their own timeframe. While this offers additional freedoms to the students, it also creates difficulties in organizing, holding, and benefitting from group interactions. For example, each member in a population of students may have each started the same educational program on different days, have performed their studies at different rates, have taken the same progress tests but on different days and, as a result, will have completed their coursework at different points in time. One of skill will appreciate the challenge of assembling a group for a group interaction in a self-paced, online environment, especially in such an education environment.

Group interaction is important. It's critical to doing business, for example, as well as in governance. This is why it is considered important to most any education, as most jobs require group communication and cooperation is some form. In addition, an assessment of relative performance during a group interaction among students is often used as a measure by potential employers. Some employers routinely use group interaction as an element of a job interview, for example, helping the employer determine whether the student might be a good fit into a particular work environment, by allowing the student to interact with different people under a variety of situations. One of skill will appreciate that, although online education provides the benefit of savings in the cost, time, and risk of travel, it has also detrimentally affected the ability of students to not only obtain the needed day-to-day social interaction that was always a mainstay of a traditional brick-and-mortar educational environment. The self-paced, online educational environment does not allow students to be on the same time-line, progress at similar rates, and test at the same time, much less be physically present at the same time.

Systems and methods of administering a group interaction in a virtual environment for online students is needed. This is particularly true in the online education market. One of skill in the art in any online group in which members participate from remote locations will appreciate a system and method that can systematically form groups for interaction among online students as follows: (i) systematically identifying a subpopulation that meets general criteria for eligibility for particular groupings, (ii) systematically offering one or more group interactions to the subpopulation, (iii) systematically separate individuals from the subpopulation to form subgroups that can be used to populate groups as desired for a group interaction; (iv) provide a systematic acceptance/opt-out/drop-out function, (v) provide a date preference prioritizer for students for advanced placement of a member into a group; (vi) provide a systematic regroup/replacement for opt-out/drop-outs; (vii) provide a member input database to compile member participation; and (viii) provide a member evaluation module to receive and compile evaluations of each member of the group, as well as to acknowledge the submission of each member's evaluation of other members.

SUMMARY

The teachings provided herein include a method for assembling a group for a group interaction in a self-paced, online environment. In some embodiments, the method comprises filtering a subpopulation from a population stored in a database, the population including members in the self-paced, online environment, and the filtering performed with a filtering engine on a non-transitory computer readable medium. The subpopulation can be selected to meet a first set of criteria relevant to the self-paced, online environment for a grouping of members for a group interaction. One of skill will appreciate that, although online education provides the benefit of savings in the cost, time, and risk of travel, it has also detrimentally affected the ability of students to not only obtain the needed day-to-day social interaction that was always a mainstay of a traditional brick-and-mortar educational environment. The self-paced, online educational environment does not allow students to be on the same time-line, progress at similar rates, and test at the same time, much less be physically present at the same time. The systems provided herein provide a solution to the problem of aligning students that meet a criteria for attending a group interaction.

In some embodiments, the grouping of members can form n groups within the subpopulation, n being an integer; and, the group interaction can include an activity occurring within each group of the n groups. The method can include offering the group interaction to each member of the subpopulation with an offering module on a non-transitory computer readable medium, the offering including notifying each respective member of the subpopulation that they met the first set of criteria for the group interaction; and, forming the n groups for the group interaction with a formation module on a non-transitory computer readable medium.

In some embodiments, the groups can continue with the group interaction, as planned, as long as there is a minimum number of participants, Pm. For example, the desired number of participants may be Pd, and actual number remaining in a group may be Pd-m, where m is the number of participants missing from the group for any reason.

In some embodiments, the method further comprises replacing an absent member in one of the n groups of the subpopulation, the replacing of the absent member done with a replacement engine on a non-transitory computer readable medium, the replacement engine identifying the absent member and a replacement member that meets the first set of criteria.

In some embodiments, then groups include a closed group, a first open group, and a second open group, the closed group ready for the group interaction, the first open group having the absent member, and the second open group having the replacement member for the replacing of the absent member of the first open group; and, the replacing includes transferring a member of the open group to replace the member of the closed group.

In some embodiments, the method further comprises structuring the group, the structuring including separating members of the subpopulation into a plurality of tiers within a predetermined group structure, the separating including filtering the members of the subpopulation through a second set of criteria relevant to the self-paced, online environment to provide a second output from the filtering engine; wherein, the separating includes designing the plurality of tiers to include (i) a set of first tier members, each member of which meets criteria within the first set of criteria for a first tier member; and, (ii) a set of second tier members, each member of which meets criteria within the second set of criteria for a second tier member.

In some embodiments, the offering further includes forming an accepted group within the subpopulation, the forming including requesting an acceptance of the offering from each member of the subpopulation from each member of the subpopulation, the requesting including confirming the acceptance of each respective member of the accepted group of the offer to participate in the group interaction.

In some embodiments, the offering further includes forming an opt-out group within the subpopulation, the forming including requesting an opt-out of the offering from each member of the subpopulation, the requesting including confirming the rejection of each respective member of the accepted group of the offer to participate in the group interaction.

In some embodiments, the offering further includes setting a deadline for the acceptance and the opt-out; and, forming a drop-out group within the subpopulation, the forming including separating the subpopulation into a group that has neither accepted nor opted-out of the offer to participate in the group interaction by the deadline. One of skill will appreciate that the deadline can be established using any period of time, for example, months, weeks, days, hours, minutes, and perhaps even seconds, in some embodiments.

It should be appreciated that the criteria used to filter out the subpopulation can be used to meet any desired goal. For example, the first criteria or second criteria can be used to tier the subpopulation by academic standing, peer review standing, or any other criteria desired. In some embodiments, the method includes setting a desired academic rating as the first set of criteria or the second set of criteria. In some embodiments, the method includes setting a desired peer review rating as the first set of criteria or the second set of criteria. And, in some embodiments, the plurality of tiers are structured through the filtering engine to form a desired distribution of members.

One of skill will appreciate that a system is required to practice the method. In some embodiments, the system for assembling a group for a group interaction in a self-paced, online environment comprises a processor and a population database on a non-transitory computer readable medium for storing data on each member of the population, the data used for sorting the population into a subpopulation that meets a first set of criteria. And, in some embodiments, the system can include a filtering engine on a non-transitory computer readable medium and configured for separating the subpopulation from the population using the stored data from the population database, the filtering engine configured with instructions to instruct the processor to filter the subpopulation from the population using the first set of criteria.

In some embodiments, the instructions include instructions for identifying members of the subpopulation that meet a first set of criteria relevant to the self-paced, online environment for assembling the group for the group interaction. In some embodiments, the system includes an offering module on a non-transitory computer readable medium, the offering module configured for offering the group interaction to each member of the subpopulation. In some embodiments, the offering module is configured with notification instructions for instructing the processor to notify each member of the subpopulation that they have met the first set of criteria for participating in the group interaction.

In some embodiments, the offering module is further configured with acceptance instructions for instructing the processor to request an acceptance of the offering from each member of the subpopulation that desires to participate in the group interaction. And, in some embodiments, the offering module is further configured with opt-out instructions for instructing the processor to request an opt-out of the offering from each member of the subpopulation that does not desire to participate in the group interaction.

In some embodiments, the system further comprises a replacement engine on a non-transitory computer readable medium, the offering module including instructions configured for instructing the processor to form one or more of (i) an accepted group having members that accepted the offering; (ii) an opt-out group having members that opted-out of the offering; and, (iii) a drop-out group having members that neither accepted nor opted-out of the offering by a deadline. In these embodiments, the replacement engine can include instructions configured for instructing the processor to replace a member of the subpopulation that has opted-out or dropped-out of the offering.

In some embodiments, the filtering engine includes instructions for separating the members of the subpopulation into n groups within the subpopulation, n being an integer. And, in some embodiments, the system includes a formation module on a non-transitory computer readable medium, the formation module configured for forming the n groups for the group interaction. In some embodiments, the n groups include a closed group and an open group. And, in some embodiments, the replacing includes transferring a member of the open group to replace a member of the closed group.

In some embodiments, the filtering engine can be further configured for structuring the group, the structuring including separating members of the subpopulation into a plurality of tiers, the separating including filtering the members of the subpopulation through a second set of criteria to provide a second output from the filtering engine; wherein, the plurality of tiers includes (i) a set of first tier members, each of which meet criteria within the second set of criteria for a first tier member; and, (ii) a set of second tier members, each of which meet criteria within the second set of criteria for a second tier member.

In some embodiments, the filtering engine is configured to structure the plurality of tiers to form a desired distribution of members. In some embodiments, the filtering engine is configured to structure the plurality of tiers to form a desired distribution of academic ratings. In some embodiments, the filtering engine is configured to structure the plurality of tiers to form a desired distribution of peer review ratings.

Moreover, the teachings are directed to a method of participating in a group interaction in a self-paced, online environment. The method can include enrolling in the self-paced, online environment, the environment including a system taught herein, and participating in the self-paced, online environment to pursue achieving the first set of criteria to become a member of the subpopulation identified by the filtering engine.

In some embodiments, the method of participating includes receiving the offer to participate in the group interaction, the offer received through the offering module; and, participating in the group interaction.

In some embodiments, the method of participating includes accepting the offer to participate in the group interaction to become a member of one group of a plurality of n groups formed by the formation module. And, in some embodiments, the method further comprises accepting the offer to participate in the group interaction to become a member of an open group in the plurality of n groups formed by the formation module, and to replace an absent member of a closed group in the plurality of n groups.

In some embodiments, the system is dynamically updated in the self-paced, online environment, in which the dynamic update occurs monthly, weekly, daily, hourly, and/or by the second. In some embodiments, the update is real-time. In some embodiments the real-time feedback ranges in response time from 1-100 milliseconds, from 5-50 milliseconds, from 2-20 milliseconds, from 3-30 milliseconds, from 4-40 milliseconds, or any range therein in intervals of 1 millisecond. In some embodiments, the dynamic update is a data update that reflects an update in the criteria of each member of the population in the database for the filtering. In some embodiments, the data in the population database is updated automatically as the data on each member of the population is updated in the online environment. In some embodiments, the population is updated, the subpopulation is updated, the offerings are updated, or the forming of the n groups is updated, either by itself or in combination with any of at least these updates.

Those of skill in the art of online environments will appreciate that the methods and systems taught herein can be used in any online environment, whether it be an online corporate environment, an online internal educational environment, an online gaming environment, an online special interest community, and the like.

BRIEF DESCRIPTION OF THE FIGURES

FIG. 3 illustrates the separation of a population into a subpopulation having a plurality of groups for a plurality of group interactions, according to some embodiments.

DETAILED DESCRIPTION OF THE INVENTIONS

A method for assembling a group for a group interaction in a self-paced, online environment is provided. Generally speaking, the method includes a filtering of a subpopulation from a population stored in a database, the population including members in the self-paced, online environment. The subpopulation can be selected to meet a first set of criteria relevant to the self-paced, online environment for a grouping of members for a group interaction. Additional criteria can be added to provide control over the selection of members for the subpopulation and, thus, control over the design of groups to provide a desired group profile for the group interaction. One of skill will appreciate that, although online education provides the benefit of savings in the cost, time, and risk of travel, it has also detrimentally affected the ability of students to not only obtain the needed day-to-day social interaction that was always a mainstay of a traditional brick-and-mortar educational environment. The self-paced, online educational environment does not allow students to be on the same time-line, progress at similar rates, and test at the same time, much less be physically present at the same time. The systems provided herein provide a solution to the problem of aligning students that meet a criteria for attending a group interaction.

Figure 1A:
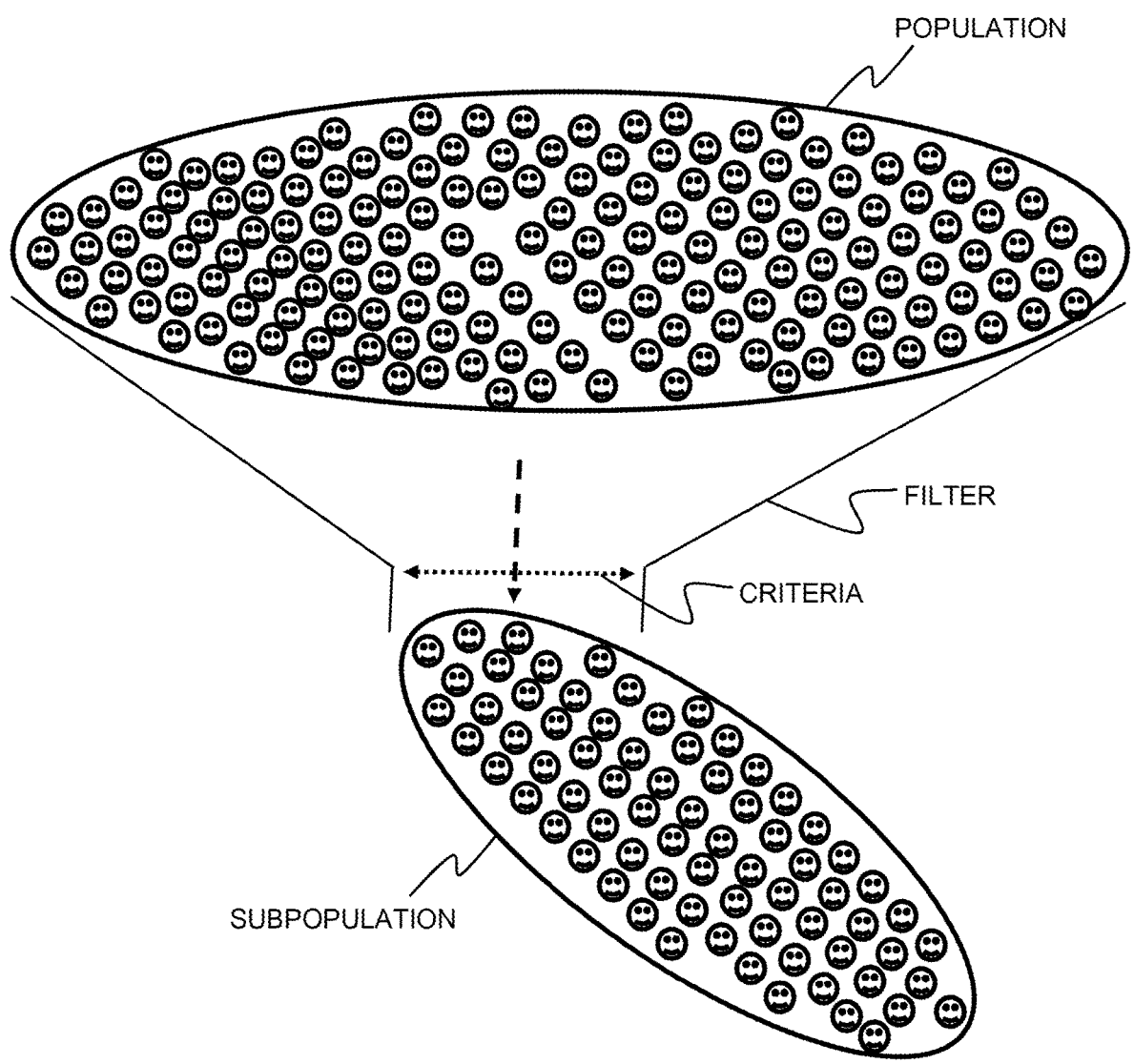
FIGS. 1A and 1B illustrate the separation of a subpopulation from a population using a criteria filtering method, and a general technology platform that can be used to perform the method, according to some embodiments.
Figure 1B:
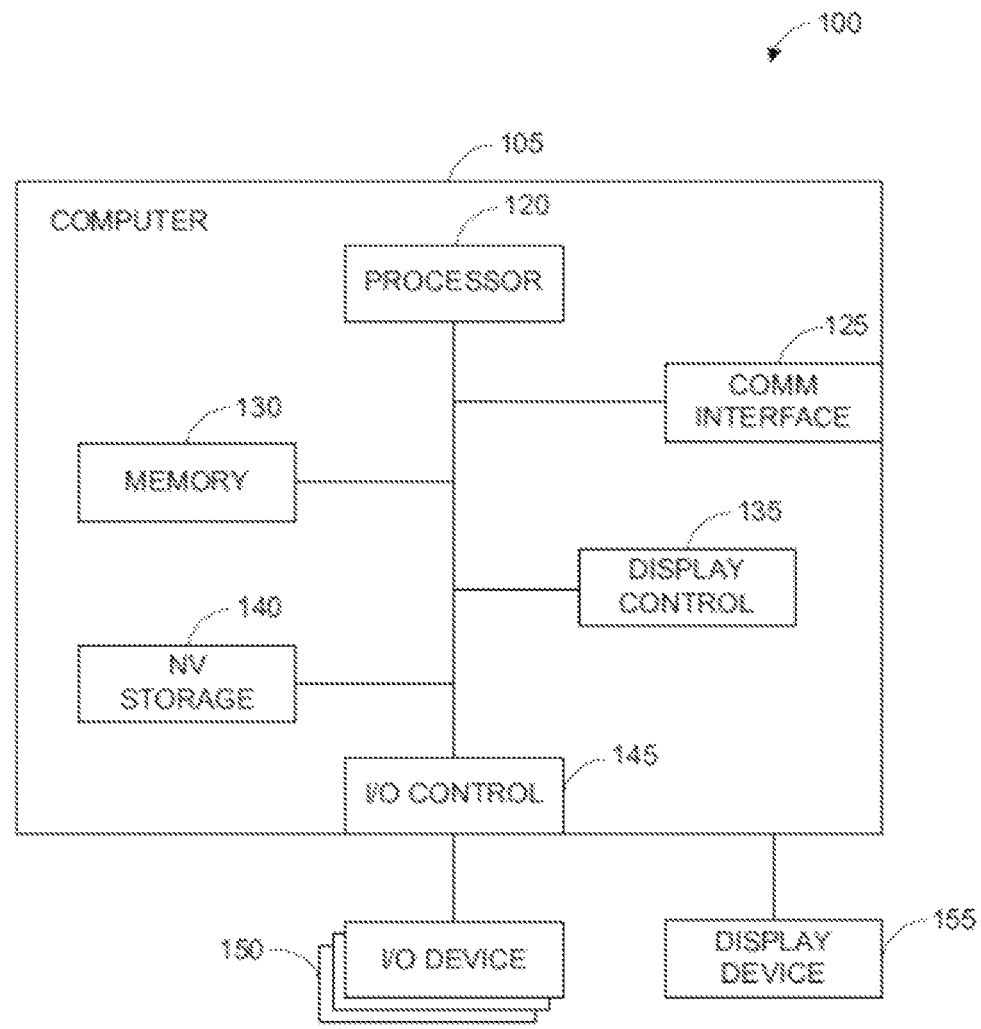

FIGS. 1A and 1B illustrate the separation of a subpopulation from a population using a criteria filtering method, and a general technology platform that can be used to perform the method, according to some embodiments. FIG. 1A illustrates the filtering of the subpopulation from the population using the criteria. The population is processed with a filter that separates the population into the subpopulation using the criteria. The criteria can be any relative measure designed to produce a subpopulation for a group interaction. The criteria, for example, can be designed to include any desired data constraints that separates the subpopulation from the population. Examples of criteria can include a performance measure that can be established as measurable data that can used to compare each member of the population to the other members of the population, such as time of participation in the population, attendance, accomplishments in the population, peer reviews and the like. Criteria in a corporate environment might include, for example, a job category, supervisory assessments, attendance, productivity, safety, and the like. Criteria in an educational environment might include, for example, class level, grades, attendance, peer review ratings, and the like. Criteria in a gaming environment might include, for example, time in the gaming population, performance in the gaming population, relevant skills, and the like. Criteria in an investment environment might include, for example, time as an investor, size of portfolio, growth achieved, expertise in a particular market or markets, and the like. Criteria in a special interest group might include, for example, time in the special interest group, or a performance measure in the special interest group such as education, experience, and the like. The special interest group can include athletes, sports enthusiasts, voters, activists, concerned citizens, and the like.

In some embodiments, the teachings are directed to a method for a user to participate in a group interaction. The term "user" can include any operator of the system which, in some embodiments, can include any user of the system in a particular population which may include, for example, an "employee," a "student," an "investor," an "activist," a "voter," an "athlete", a "sports enthusiast," and the like.

An advantage of the system is the ability to overcome the difficulties in organizing group interactions among subpopulations within populations in an online environment, and it is particularly advantageous in a self-paced, online environment. The difficulties can include, for example, accurately and timely identifying and separating the subpopulation from the population, accurately and timely offering group formation to participants, accurately and timely forming groups having the desired participants, accurately and timely replacing of participants that did not participate, opted out, or left a group.

The terms "accurate," "accurately," "timely", and the like, can be used to refer to a measurable error, or in some embodiments the absence of a measurable error, in the difference between a change in data, and the ability of the process to detect a change and provide an action, an update, or correction, for example. As a change in data occurs for a user, for example, such as a change in time or status within a population, a change in academic progress or academic performance, or any other criteria change taught herein, the process works to detect the change and update the user within the population with precision. The terms "precise," "precisely," "precision," and the like can be used, for example, to refer the ability of the process to update the subpopulation and group formation for interactions. The high degree of accuracy provided through the systems and methods taught herein produces, in response, likewise results in a high degree of precision for the user as well.

In some embodiments, the systems methods provided herein results in substantially no error in the selecting of the desired portion, such that any error may be isolated to fall within a relatively high accuracy of a computing system performing the functions taught herein which, in some embodiments, any error may be statistically insignificant within a 95% confidence level. In some embodiments, the error can range from 80%-99%, 85%-95%, 75%-99%, or any range therein. In some embodiments, the error may be statistically insignificant within an 80%, 85%, 90%, 95%, 96%, 97%, 98%, 99%, or any % or range therein in increments of 0.1%.

In some embodiments, the process can update user data in real-time, or near real-time, where the measure of "updating time" is measured from the time at which a user's data is changed digitally in a system used to create a subpopulation using the criteria filter. Generally speaking, in some embodiments, the updating time can be in "near real-time" which can occur in less than a minute but more than a second. As such, in some embodiments, "real-time" updating time can be less than a second. A computing system may be, for example, updating a data entry for the user, in real-time, in less than about 3 milliseconds, between about 0.5 milliseconds and about 3 milliseconds, and less than perhaps a single millisecond. It should be appreciated, however, that the update can also happen in less than real-time, perhaps in minutes, hours, days, or weeks, and this can be a setting for updates that is desired by an administrator of the system to gather a desired number of members in a subpopulation from a filtering criteria. In some embodiments, the updating can occur from about 50 milliseconds to about 20 minutes. In some embodiments, the updating can occur in a time that is very short, for example, ranging from about 90 ms to perhaps about 0.5 seconds or 1 second.

In some embodiments, the criteria filter can be modified to fill a subpopulation as needed. For example, (i) a "nudge' function can be created that allows a user some variance around the selection criteria for the criteria filter, allowing the user to be included in a subpopulation; and, (ii) rules that automatically provide such variance according to subpopulation size and time constraints, so that the subpopulations can be formed to meet a deadline for group interactions, benefitting members of the subpopulation that may need to participate in such group interaction by a particular date.

FIG. 1B shows a general technology platform for the system, according to some embodiments. The computer system 100 may be a conventional computer system and includes a computer 105, I/O devices 150, and a display device 155. The computer 105 can include a processor 120, a communications interface 125, memory 130, display controller 135, non-volatile storage 140, and I/O controller 145. The computer system 100 may be coupled to or include the I/O devices 150 and display device 155.

The computer 105 interfaces to external systems through the communications interface 125, which may include a modem or network interface. It will be appreciated that the communications interface 125 can be considered to be part of the computer system 100 or a part of the computer 105. The communications interface 125 can be an analog modem, isdn modem, cable modem, token ring interface, satellite transmission interface (e.g. "direct PC"), or other interfaces for coupling the computer system 100 to other computer systems. In a cellular telephone, this interface is typically a radio interface for communication with a cellular network and may also include some form of cabled interface for use with an immediately available personal computer. In a two-way pager, the communications interface 125 is typically a radio interface for communication with a data transmission network but may similarly include a cabled or cradled interface as well. In a personal digital assistant, the communications interface 125 typically includes a cradled or cabled interface and may also include some form of radio interface, such as a BLUETOOTH or 802.11 interface, or a cellular radio interface, for example.

The processor 120 may be, for example, any suitable processor, such as a conventional microprocessor including, but not limited to, an Intel Pentium microprocessor or Motorola power PC microprocessor, a Texas Instruments digital signal processor, or a combination of such components. The memory 130 is coupled to the processor 120 by a bus. The memory 130 can be dynamic random access memory (DRAM) and can also include static ram (SRAM). The bus couples the processor 120 to the memory 130, also to the non-volatile storage 140, to the display controller 135, and to the I/O controller 145.

The I/O devices 150 can include a keyboard, disk drives, printers, a scanner, and other input and output devices, including a mouse or other pointing device. The display controller 135 may control in the conventional manner a display on the display device 155, which can be, for example, liquid crystal display (LCD). The display controller 135 and the I/O controller 145 can be implemented with conventional well-known technology, meaning that they may be integrated together, for example.

The non-volatile storage 140 is often a FLASH memory or read-only memory, or some combination of the two. A magnetic hard disk, an optical disk, or another form of storage for large amounts of data may also be used in some embodiments, although the form factors for such devices typically preclude installation as a permanent component in some devices. Rather, a mass storage device on another computer is typically used in conjunction with the more limited storage of some devices. Some of this data is often written, by a direct memory access process, into memory 130 during execution of software in the computer 105. One of skill in the art will immediately recognize that the terms "machine-readable medium" or "computer-readable medium" includes any type of storage device that is accessible by the processor 120 and also encompasses a carrier wave that encodes a data signal. Objects, methods, inline caches, cache states and other object-oriented components may be stored in the non-volatile storage 140, or written into memory 130 during execution of, for example, an object-oriented software program.

The computer system 100 is one example of many possible different architectures. For example, personal computers based on an Intel microprocessor often have multiple buses, one of which can be an I/O bus for the peripherals and one that directly connects the processor 120 and the memory 130 (often referred to as a memory bus). The buses are connected together through bridge components that perform any necessary translation due to differing bus protocols.

In addition, the computer system 100 can be controlled by operating system software which includes a file management system, such as a disk operating system, which is part of the operating system software. One example of an operating system software with its associated file management system software is the family of operating systems from Microsoft Corporation of Redmond, Washington, and their associated file management systems. Another example of operating system software with its associated file management system software is the LINUX operating system and its associated file management system. Another example of an operating system is an ANDROID, or perhaps an iOS, operating system. The file management system is typically stored in the non-volatile storage 140 and causes the processor 120 to execute the various acts required by the operating system to input and output data and to store data in memory, including storing files on the non-volatile storage 140. Other operating systems may be provided by makers of devices, and those operating systems typically will have device-specific features which are not part of similar operating systems on similar devices. Similarly, MacOS, MacOS X, IOS or ANDROID operating systems, for example, may be adapted to specific devices for specific device capabilities.

The computer system 100 may be integrated onto a single chip or set of chips in some embodiments, and can be fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Figure 2:
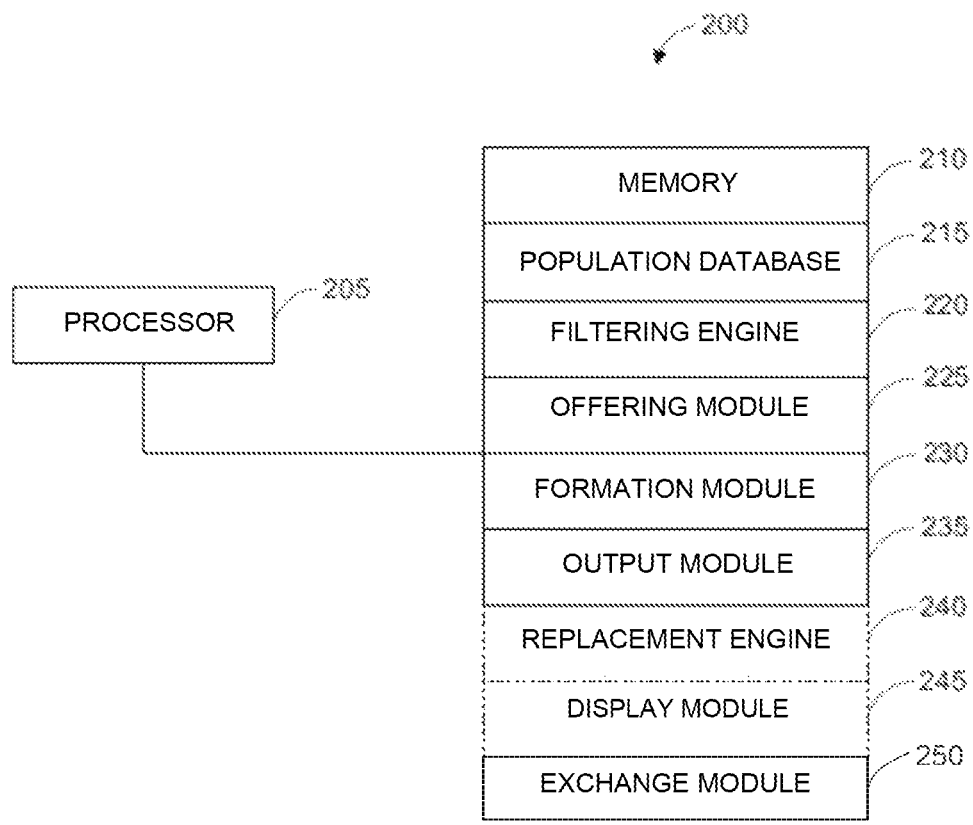
FIG. 2 illustrates a processor-memory diagram to describe components of the systems taught herein, according to some embodiments.

FIG. 2 illustrates a processor-memory diagram to describe components of the system, according to some embodiments. The system 200 shown in FIG. 2 contains a processor 205 and a memory 210 (that can include non-volatile memory), wherein the memory 210 includes a population database 215, a filtering engine 220, an offering module 225, a formation module 230, and an output module 235. In some embodiments, the system can include a replacement engine 240, a display module 245, and a data exchange module 250. The display module 240, can display video, for example, and can also be a part of the output module 235. The data exchange module 245 can be operable to exchange data with external computer readable media. All memory, such as the engines and modules, for example, are embodied in a non-transitory computer readable medium.

The system includes input/output devices (not shown) operable to receive and audio data or video data on a non-transitory computer readable medium, such as the exchange module 250. Examples of input devices are operable to interact with external data formats, voice-recognition software, a hand-held device in communication with the system including, but not limited to, a microphone, and the like, as well as a camera or other video image capture and transmission device. It should be appreciated that the input and output can be an analog or digital audio or video, The population database 215 is operable to store data on each member of the population for access on a non-transitory computer readable storage medium. Any digital data can be stored and accessed, including text files, as well as audio or video files known to one of skill in the art. As such, sound files, text files, image files, and the like can be processed. In some embodiments, the system can access any of a variety of accessible data through a data exchange module, as discussed above.

Any text format can be used. And, any audio or video format known to one of skill in the art can be used. In some embodiments, the audio file comprises a format that supports one audio codec and, in some embodiments, the audio file comprises a format that supports multiple codecs. In some embodiments the audio file comprises an uncompressed audio format such as, for example, WAV, AIFF, and AU. In some embodiments, the audio file format comprises lossless compression such as, FLAC, Monkey's Audio having file extension APE, WayPack having file extension WV, Shorten, Tom's lossless Audio Kompressor (TAK), TTA, ATRAC Advanced Lossless, Apple Lossless, and lossless WINDOWS Media Audio (WMA). In some embodiments, the audio file format comprises lossy compression, such as MP3, Vorbis, Musepack, ATRAC, lossy WINDOWS Media Audio (WMA) and AAC.

In some embodiments, the audio format is an uncompressed PCM audio format, as a ".wav" for a WINDOWS computer readable media, or as a ".aiff" as a MAC OS computer readable media. In some embodiments a Broadcast Wave Format (BWF) can be used, allowing metadata to be stored in the file. In some embodiments, the audio format is a lossless audio format, such as FLAC, WayPack, Monkey's Audio, ALAC/Apple Lossless. In some embodiments, the lossless audio format provides a compression ratio of about 2:1. In some embodiments, the audio format is a free-and-open format, such as way, ogg, mpc, flac, aiff, raw, au, or mid, for example. In some embodiments, the audio format is an open file format, such as gsm, dct, vox, aac, mp4/m4a, or mmf. In some embodiments the audio format is a proprietary format, such as mp3, wma, atrac, ra, ram, dss, msv, dvg, IVS, m4p, iklax, mxp4, and the like.

In some embodiments, the filtering is performed with a filtering engine on a non-transitory computer readable medium. The filtering engine 220 is operable to filter, or separate, a subpopulation from a population stored in the population database 215. In some embodiments, the subpopulation meets a first set of criteria relevant to the self-paced, online environment for a grouping of members for a group interaction. The filtering engine 220 can be configured with instructions to instruct the processor 205 to filter the subpopulation from the population database 215 using the first set of criteria. And, in some embodiments, the instructions include instructions for identifying members of the subpopulation that meet a first set of criteria relevant to the self-paced, online environment for assembling the group for the group interaction.

The system can also include an offering module 225 embodied in a non-transitory computer readable medium. The offering module 225 can be, for example configured for offering the group interaction to each member of the subpopulation. In some embodiments, the offering module 225 is configured with notification instructions for instructing the processor to notify each member of the subpopulation that they have met the first set of criteria for participating in the group interaction. In some embodiments, the offering module 225 is further configured with acceptance instructions for instructing the processor 205 to request an acceptance of the offering from each member of the subpopulation that desires to participate in the group interaction. And, in some embodiments, the offering module 225 is further configured with opt-out instructions for instructing the processor 205 to request an opt-out of the offering from each member of the subpopulation that does not desire to participate in the group interaction.

In some embodiments, the system further comprises a replacement engine 240 on a non-transitory computer readable medium, the offering module 225 including instructions configured for instructing the processor 205 to form one or more of (i) an accepted group having members that accepted the offering; (ii) an opt-out group having members that opted-out of the offering; and, (iii) a drop-out group having members that neither accepted nor opted-out of the offering by a deadline. In these embodiments, the replacement engine 240 can include instructions configured for instructing the processor 205 to replace a member of the subpopulation that has opted-out or dropped-out of the offering.

FIG. 3 illustrates the separation of a population into a subpopulation having a plurality of groups for a plurality of group interactions, according to some embodiments. As shown in FIG. 3, the population 305 is filtered to create subpopulation 350 using filter 310 that includes a separation into a first criteria 315. As described herein, the criteria is set to design a desired content of members in the subpopulation 350 for a group interaction.

In some embodiments, the filtering engine can be further configured for structuring the group, the structuring including separating members of the subpopulation into a plurality of tiers, the separating including filtering the members of the subpopulation through a second set of criteria to provide a second output from the filtering engine; wherein, the plurality of tiers includes (i) a set of first tier members, each of which meet criteria within the second set of criteria for a first tier member; and, (ii) a set of second tier members, each of which meet criteria within the second set of criteria for a second tier member. In FIG. 3, for example, the first criteria 315 produces a set of first tier members 355, and the second criteria produces a set of second tier members 360.

In some embodiments, the set of second tier members meets the first criteria before also meeting the second criteria. Having the ability to filter using a plurality of criteria allows for the design of many different types of group profiles. In one example, in education, one group profile may simply include a single filter that includes members that have a particular academic criteria, such as a passing grade in a course, regardless of grade. In another example, in education, another group profile may require the passing grade in the course as a first criteria, and a minimum peer review rating as a second criteria, allowing the subpopulation to be separated into first tier members and second tier members to add some control to the group profile beyond a mere passing grade.

Many populations will require the formation of numerous groups. In educational institutions, for example, there may be a large population that produces a large subpopulation that can be used to form several groups, each having it's own group interaction. In some embodiments, the filtering engine includes instructions for separating the members of the subpopulation into n groups within the subpopulation, n being an integer. The integer can range from $0-n_i$, where i can be any integer up to the total number of members in the population database 305 divided by the number of desired members per group. In FIG. 3, for example, i=14, where 13 closed groups of 5 might be formed from the subpopulation 350, and the $14^{th}$ group is an open group that can possibly be filled by any members that may arise from an update to the population database, perhaps, be used as a place to keep members on reserve for replacement of members that leave an open group. As noted, the systems and methods taught herein can include a replacement engine to replace group members. In FIG. 3, for example, groups n361-n369 and n371-n374 are closed groups, meaning they were formed to meet the desired group profile. However, groups n367 and n374 each lost a member of it's respective group. The replacement engine identifies that these groups each lost a member and replaces the lost members with members from open group n370.

In some embodiments, the system includes a formation module 230 on a non-transitory computer readable medium, the formation module 230 configured for forming the n groups for the group interaction. In some embodiments, the n groups include a closed group and an open group. And, in some embodiments, the replacing includes transferring a member of the open group to replace a member of the closed group.

One of skill will appreciate that a group interaction may have difficulty reaching a goal of the interaction if there is an insufficient number of members attending the group interaction. As such, in some embodiments, the groups can continue with the group interaction, as planned, as long as there is a minimum number of participants, Pm. For example, the desired number of participants may be Pd, and actual number remaining in a group may be Pd-m, where m is the number of participants missing from the group for any reason. The formation module, for example, can be programmed to identify the present status of any group within the n groups to determine of the interaction should be allowed to continue, or should be stopped. In these embodiments, an administrator of the system can select the minimum number of members that are required to attend the group interaction, and the system will either allow or cancel the group interaction if the required number of members is not reached. The attendance can be easily monitored, in some embodiments, by a digital presence of the member during the group interaction, for example. Such a digital presence may require a log-in process, a video presence to show attendance, an audio presence to show participation, a periodic request for feedback to show that the member is still attending during a meeting, a question/answer requirement to show attendance and comprehension, or some combination thereof. Any memory module can be programmed and designed to monitor attendance in this way, so that the desired group interaction experience is obtained by the members. In some embodiments, for example, the formation module can be programmed and designed to monitor attendance in this way, so that the desired group interaction experience is obtained by the members. In some embodiments, for example, the replacement engine can be programmed and designed to monitor attendance in this way, so that the desired group interaction experience is obtained by the members, where the replacement engine can be used to identify missing members in a group, replaces the missing members in the group if possible, monitors the group attendance to determine whether the required number of members are present for any one or more group interactions, and either allows the interaction to continue or cancels the interaction.

If a group interaction involves a series of meetings, the system can also determine if each member attends the required number of meetings to complete the group interaction. That is, in some embodiments, it is not enough to merely have a sufficient number of members to continue, but each member in the group must also attend the required number of meetings to continue in the group interaction. For example, if a member of a group needs to attend 5 of 6 meetings to complete the interaction, that member will be deemed to have "completed" the group interaction if they only attended <5, perhaps 4, of the 6 meetings. Moreover, if a sufficient number of the group does not attend the required number of meetings, then the group interaction can also be deemed to be incomplete, as the group did not benefit from the attendance of the required number of members at the required number of meetings. It should be appreciated that the system can be refined to monitor attendance of each member, the number of members in attendance at any one or all meetings, and determine whether all meeting criteria have been met for the group interaction to be considered "complete" for any member of the group. In some embodiments, these system functions can be identified as an "electronic proctor" function that allows the system to oversee the group interaction in such ways to determine through this monitoring technology whether the interaction functioned as intended. Any memory in the system can be programmed with a desired set of instructions for this electronic proctor function including, for example, the formation module, the replacement engine, another module not shown here in particular, and the like.

It should be appreciated that the technology provided herein allows for the design of nearly any desired group profile for designing group interactions from the population. Any number of additional criteria filters in the plurality of criteria can be used, for example, to create any desired distribution of members in the subpopulation 350. In some embodiments, the filtering engine can be configured to structure the plurality of tiers to form a desired distribution of academic ratings. In some embodiments, the filtering engine can be configured to structure the plurality of tiers to form a desired distribution of peer review ratings.

Figure 4A:
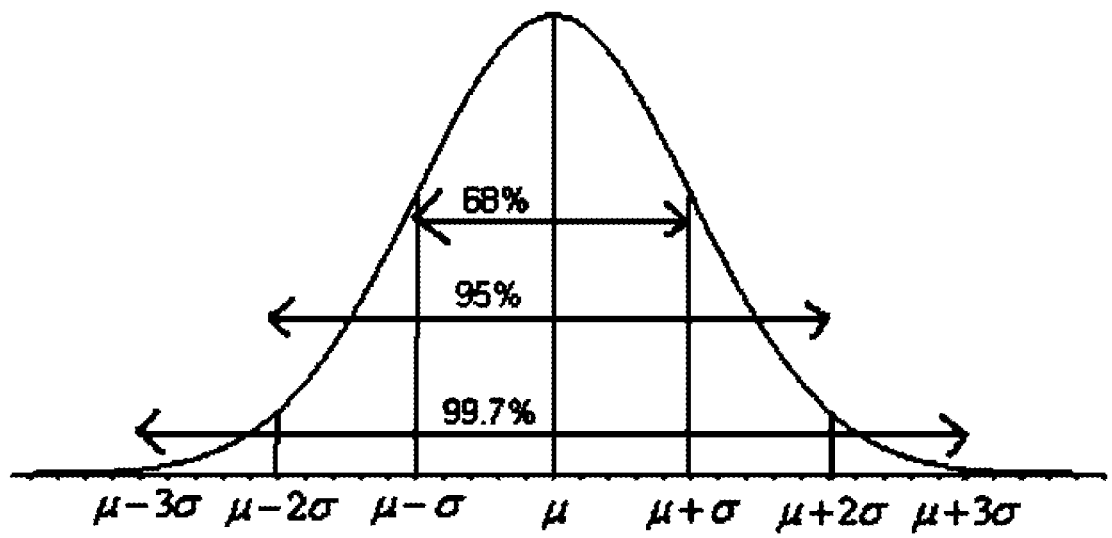
FIGS. 4A-4C illustrate a variety of distributions that can be created using the filtering engine with a plurality of criteria, according to some embodiments.
Figure 4B:
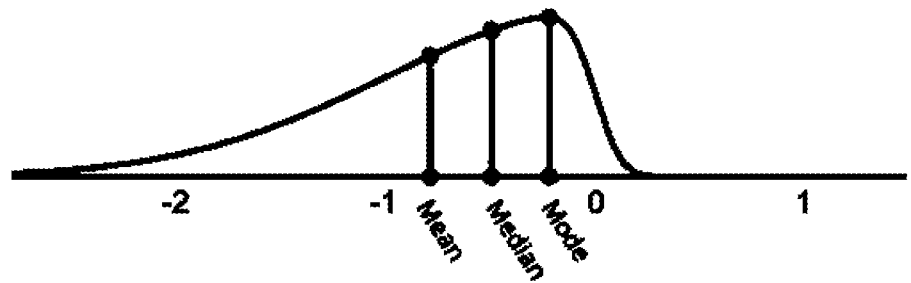
Figure 4C:
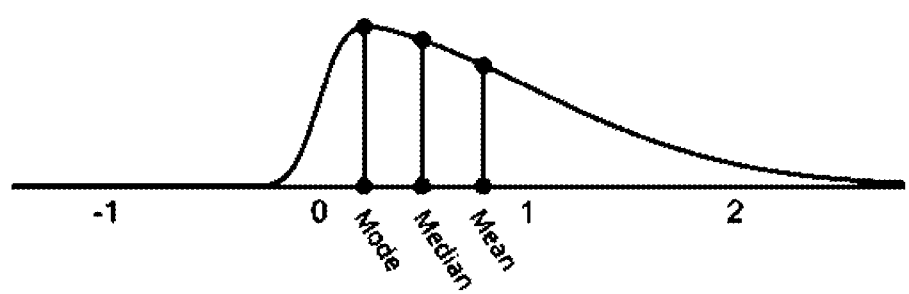

FIGS. 4A-4C illustrate a variety of distributions that can be created using the filtering engine with a plurality of criteria, according to some embodiments. FIG. 4A shows a normal distribution having confidence limits of 68% of the subpopulation, 95% of the subpopulation, and 99.7% of the subpopulation, where p represents the mean and a represents standard deviation. If it is desired to have a normal distribution of a particular metric, filtering criteria can be designed to obtain, or at least approximate, a normal distribution of members. For example, if it is desired to have a normal distribution of passing scores for a particular course, the first step may be to filter according to all members having a passing score in the particular course. Next, the mean grade, $\mu$, can be determined, and the standard deviation, $\sigma$, can be determined for the subpopulation that was filtered using the first criteria. Criteria filters of $\mu-3\sigma$, $\mu-2\sigma$, $\mu-\sigma$, $\mu$, $\mu+\sigma$, $\mu+2\sigma$, and $\mu+3\sigma$ can be used to model the normal distribution. One of skill will appreciate that the same or similar use of the mean and standard deviation can be used to create any desired distribution for any select criteria. It has been found that education curves may often be skewed from normal, however, and so skewed distribution, such as those in FIGS. 4B and 4C might be used to model various educational group subpopulations. In fact, one of skill will appreciate that there is value to designing a distribution structure that can be used to impart a group interaction experience, and any distribution of a desired criteria can be modeled using the systems and methods taught herein. In some embodiments, a distribution will be a normal distribution. In some embodiments, a distribution will be a unimodal distribution. In some embodiments, a distribution will be a biomodal distribution. In some embodiments, a distribution will be a multimodal distribution. And, those of skill will appreciate that a plurality of criteria can be represented by any plurality of distributions taught herein.

One of skill will appreciate that the desired distribution will depend on the criteria and the group that is being formed for the group interaction. As noted above, the criteria can include a performance measure, in some embodiments, that can be used as data to compare/rate each member of the population with respect to the other members of the population, such as time of participation in the population, attendance, accomplishments in the population, peer reviews and the like. Criteria in a corporate environment might include, for example, a job category, supervisory assessments, attendance, productivity, safety, and the like. Criteria in an educational environment might include, for example, class level, grades, attendance, peer review ratings, and the like. Criteria in a gaming environment might include, for example, time in the gaming population, performance in the gaming population, relevant skills, and the like. Criteria in an investment environment might include, for example, time as an investor, size of portfolio, growth achieved, expertise in a particular market or markets, and the like. Criteria in a special interest group might include, for example, time in the special interest group, or a performance measure in the special interest group such as education, experience, and the like. The special interest group can include athletes, sports enthusiasts, voters, activists, concerned citizens, and the like.

Each environment in which the group interaction can be designed can have it's own, particular distribution of members. One particularly useful embodiment can include an assembly of voter types to discuss one or more political issues. The use of criteria to filter and assemble voter groups can help us to understand how different combinations of voters can affect the outcome of an election or public opinion. It can also be used to help understand how the different combinations of voter types can influence each other. In fact, the system can also be used to form the n groups discussed above, but it can do so by changing the distribution of members among the n groups, rather than construct all of the the groups with the same distributions of members. The varying distributions can be statistically designed to provide a clear analysis of how voter types interact, make decisions, influence public opinion, determine the outcome of an election, and the like, for example. Of course any such analysis can be done in an academic environment, as well. Such a method of analysis can be used as a polling study, a social study, a psychology study, and the like. Similar group interaction designs can be used and implemented for market or consumer analyses, product acceptance, product design, and the like, in some embodiments.

In addition, the system can include an output module 235 embodied in a non-transitory computer readable medium, wherein the output module 235 is operable to transmit audio and/or video data to an output device, which can be a graphical user interface, or video display. The output device can be operable to provide the audio and/or visual data feeds for the group interactions. In some embodiments, the output device comprises a speaker, a graphical user interface, or both a speaker and a graphical user interface, for example.

One of skill will appreciate that timely updating of data will be assisted through the use of time-stamping. Time stamping of data samples can also be used to synchronize between other data streams in the updating of data for the members of the population.

As described above, the system can further comprise an exchange module 250 embodied in a non-transitory computer readable medium, which can be configured for exchanging data among members of the population. The data exchange module 250 is operable to exchange data with external computer readable media, for example, and can serve as a messaging module operable to allow users to communicate with other users. Constraints can be set, for example, to identify users having like subject-profiles, or others users in a profile independent manner, merely upon election of the user. The users can email one another, post blogs, or have instant messaging capability for communications, which can also occur in real-time in some embodiments. The users have video and audio capability in the communications, wherein the system implements data streaming methods known to those of skill in the art. In some embodiments, the system is contained in a hand-held device; operable to function as a particular machine or apparatus having the additional function of telecommunications, word processing, or gaming; or operable to function as a particular machine or apparatus not having other substantial functions.

Figure 5:
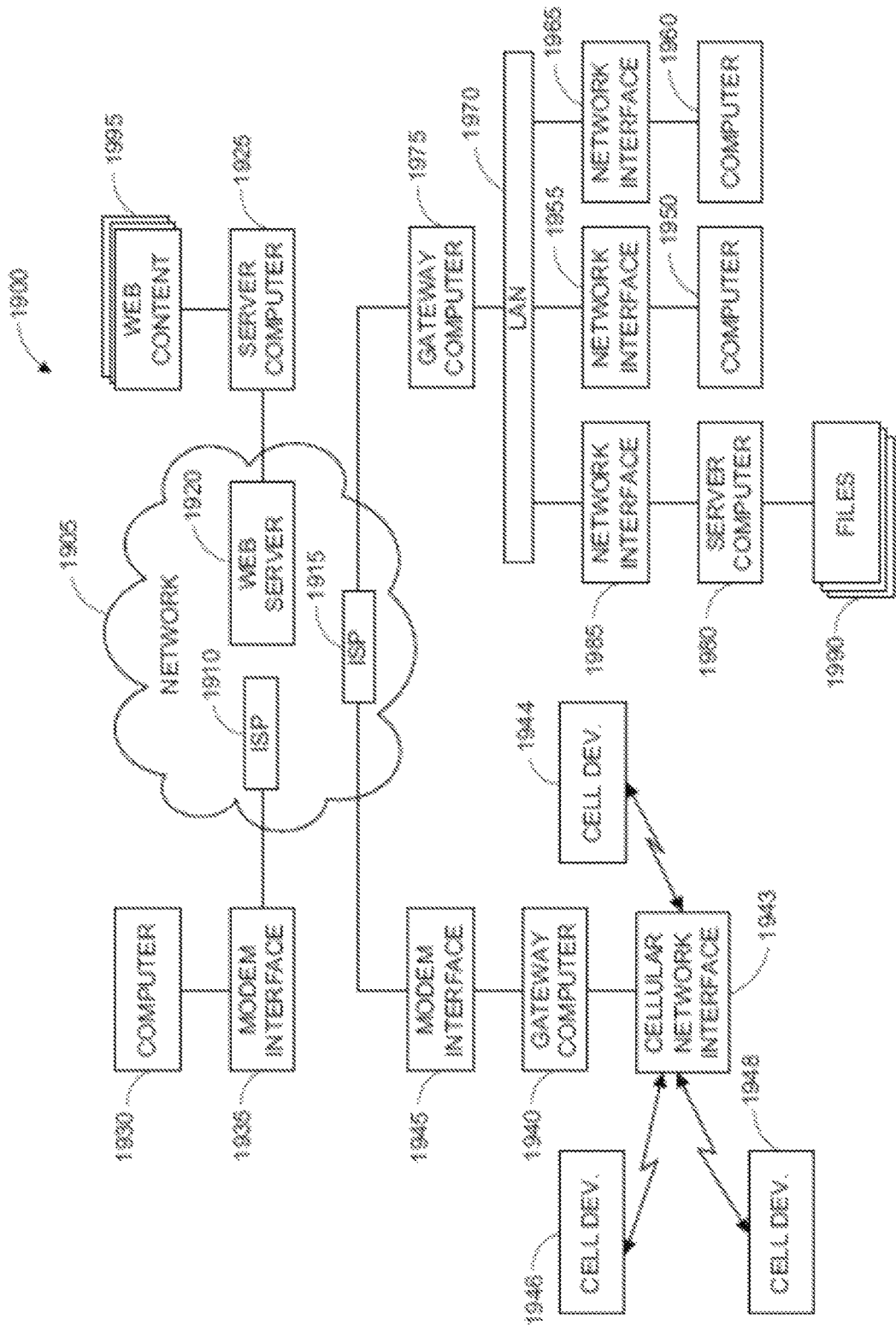
FIG. 5 shows how a network may be used for the system, according to some embodiments.

FIG. 5 shows how a network may be used for the system, according to some embodiments. Several computer systems are coupled together through a network 1905, such as the internet, along with a cellular network and related cellular devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 1905 is typically provided by internet service providers (ISP), such as the ISPs 1910 and 1915. Users on client systems, such as client computer systems 1930, 1950, and 1960 obtain access to the internet through the internet service providers, such as ISPs 1910 and 1915. Access to the internet allows users of the client computer systems to exchange information, receive and send e-mails, and view documents, such as documents which have been prepared in the HTML format. These documents are often provided by web servers, such as web server 1920 which is considered to be "on" the internet. Often these web servers are provided by the ISPs, such as ISP 1910, although a computer system can be set up and connected to the internet without that system also being an ISP.

The web server 1920 is typically at least one computer system which operates as a server computer system and is configured to operate with the protocols of the world wide web and is coupled to the internet. Optionally, the web server 1920 can be part of an ISP which provides access to the internet for client systems. The web server 1920 is shown coupled to the server computer system 1925 which itself is coupled to web content 1995, which can be considered a form of a media database. While two computer systems 1920 and 1925 are shown in FIG. 5, the web server system 1920 and the server computer system 1925 can be one computer system having different software components providing the web server functionality and the server functionality provided by the server computer system 1925 which will be described further below.

Cellular network interface 1943 provides an interface between a cellular network and corresponding cellular devices 1944, 1946 and 1948 on one side, and network 1905 on the other side. Thus cellular devices 1944, 1946 and 1948, which may be personal devices including cellular telephones, two-way pagers, personal digital assistants or other similar devices, may connect with network 1905 and exchange information such as email, content, or HTTP-formatted data, for example. Cellular network interface 1943 is coupled to computer 1940, which communicates with network 1905 through modem interface 1945. Computer 1940 may be a personal computer, server computer or the like, and serves as a gateway. Thus, computer 1940 may be similar to client computers 1950 and 1960 or to gateway computer 1975, for example. Software or content may then be uploaded or downloaded through the connection provided by interface 1943, computer 1940 and modem 1945.

Client computer systems 1930, 1950, and 1960 can each, with the appropriate web browsing software, view HTML pages provided by the web server 1920. The ISP 1910 provides internet connectivity to the client computer system 1930 through the modem interface 1935 which can be considered part of the client computer system 1930. The client computer system can be a personal computer system, a network computer, a web TV system, or other such computer system.

Similarly, the ISP 1915 provides internet connectivity for client systems 1950 and 1960, although as shown in FIG. 5, the connections are not the same as for more directly connected computer systems. Client computer systems 1950 and 1960 are part of a LAN coupled through a gateway computer 1975. While FIG. 5 shows the interfaces 1935 and 1945 as generically as a "modem," each of these interfaces can be an analog modem, isdn modem, cable modem, satellite transmission interface (e.g. "direct PC"), or other interfaces for coupling a computer system to other computer systems.

Client computer systems 1950 and 1960 are coupled to a LAN 1970 through network interfaces 1955 and 1965, which can be ethernet network or other network interfaces. The LAN 1970 is also coupled to a gateway computer system 1975 which can provide firewall and other internet related services for the local area network. This gateway computer system 1975 is coupled to the ISP 1915 to provide internet connectivity to the client computer systems 1950 and 1960. The gateway computer system 1975 can be a conventional server computer system. Also, the web server system 1920 can be a conventional server computer system. Alternatively, a server computer system 1980 can be directly coupled to the LAN 1970 through a network interface 1985 to provide files 1990 and other services to the clients 1950, 1960, without the need to connect to the internet through the gateway system 1975.

Through the use of such a network, for example, the system can also provide an element of social networking, and also a gaming platform, whereby users can contact other users having similar subject-profiles and compete with one another qualitative and/or quantitatively, using subject scores or actual numerical scores. In some embodiments, the system can include a messaging module operable to deliver notifications via email, SMS, and other mediums. In some embodiments, the system is accessible through a portable, single unit device and, in some embodiments, the input device, the graphical user interface, or both, is provided through a portable, single unit device. In some embodiments, the portable, single unit device is a hand-held device. In some embodiments, the systems and methods can operate from the server to a user, from the user to a server, from a user to a user, from a user to a plurality of users, in an MMO environment, from a user to a server to a user, from a server to a user (or plurality of users) and a teacher (or plurality of teachers), or a server to a plurality of users and a conductor, for example. The teachers or conductors can be either real-time teachers or conductors, simulated teachers or conductors, or recorded teachers or conductors, in some embodiments. The network can provide text and/or audio for real-time messaging, posting of messages, posting of instructional, posting of news or other items of a related interest to the users, and the like.

The systems and methods taught herein include the use of the computer system within any larger network system or method. It should also be appreciated that a network can include traditional network media. For example, television cable, optical fiber, satellite, and the like, in which such digital information can be transmitted to users.

The systems set-forth above allow the art to practice a method for assembling a group for a group interaction in a self-paced, online environment. In some embodiments, the method comprises filtering a subpopulation from a population stored in a database, the population including members in the self-paced, online environment, and the filtering performed with a filtering engine on a non-transitory computer readable medium. The subpopulation can be selected to meet a first set of criteria relevant to the self-paced, online environment for a grouping of members for a group interaction. And, the grouping of members can form n groups within the subpopulation, n being an integer; and, the group interaction can include an activity occurring within each group of the n groups. The method can include offering the group interaction to each member of the subpopulation with an offering module on a non-transitory computer readable medium, the offering including notifying each respective member of the subpopulation that they met the first set of criteria for the group interaction; and, forming the n groups for the group interaction with a formation module on a non-transitory computer readable medium.

In some embodiments, the method further comprises replacing an absent member in one of the n groups of the subpopulation, the replacing of the absent member done with a replacement engine on a non-transitory computer readable medium, the replacement engine identifying the absent member and a replacement member that meets the first set of criteria.

In some embodiments, the n groups include a closed group, a first open group, and a second open group, the closed group ready for the group interaction, the first open group having the absent member, and the second open group having the replacement member for the replacing of the absent member of the first open group; and, the replacing includes transferring a member of the open group to replace the member of the closed group.

In some embodiments, the method further comprises structuring the group, the structuring including separating members of the subpopulation into a plurality of tiers within a predetermined group structure, the separating including filtering the members of the subpopulation through a second set of criteria relevant to the self-paced, online environment to provide a second output from the filtering engine; wherein, the separating includes designing the plurality of tiers to include (i) a set of first tier members, each member of which meets criteria within the first set of criteria for a first tier member; and, (ii) a set of second tier members, each member of which meets criteria within the second set of criteria for a second tier member.

In some embodiments, the offering further includes forming an accepted group within the subpopulation, the forming including requesting an acceptance of the offering from each member of the subpopulation from each member of the subpopulation, the requesting including confirming the acceptance of each respective member of the accepted group of the offer to participate in the group interaction.

In some embodiments, the offering further includes forming an opt-out group within the subpopulation, the forming including requesting an opt-out of the offering from each member of the subpopulation, the requesting including confirming the rejection of each respective member of the accepted group of the offer to participate in the group interaction.

In some embodiments, the offering further includes setting a deadline for the acceptance and the opt-out; and, forming a drop-out group within the subpopulation, the forming including separating the subpopulation into a group that has neither accepted nor opted-out of the offer to participate in the group interaction by the deadline.

It should be appreciated that the criteria used to filter out the subpopulation can be used to meet any desired goal. For example, the first criteria or second criteria can be used to tier the subpopulation by academic standing, peer review standing, or any other criteria desired. In some embodiments, the method includes setting a desired academic rating as the first set of criteria or the second set of criteria. In some embodiments, the method includes setting a desired peer review rating as the first set of criteria or the second set of criteria. And, in some embodiments, the plurality of tiers are structured through the filtering engine to form a desired distribution of members. Any criteria can be used to provide control over the members filtered into the subpopulation for a group interaction.

Moreover, the teachings are directed to a method of participating in a group interaction in a self-paced, online environment. The method can include enrolling in the self-paced, online environment, the environment including a system taught herein, and participating in the self-paced, online environment to pursue achieving the first set of criteria to become a member of the subpopulation identified by the filtering engine.

In some embodiments, the method of participating includes receiving the offer to participate in the group interaction, the offer received through the offering module; and, participating in the group interaction.

In some embodiments, the method of participating includes accepting the offer to participate in the group interaction to become a member of one group of a plurality of n groups formed by the formation module. And, in some embodiments, the method further comprises accepting the offer to participate in the group interaction to become a member of an open group in the plurality of n groups formed by the formation module, and to replace an absent member of a closed group in the plurality of n groups.

I claim:

1. An electronic proctor method for assembling and monitoring students for a group interaction in an online academic environment in which the students can communicate in groups from remote locations, the method comprising:

obtaining a processor and a memory for performing the method;

filtering a subpopulation of students from a total student population stored in a database on a non-transitory computer readable medium, the population including students in the online academic environment, and the filtering performed with a filtering engine on a non-transitory computer readable medium; wherein, the subpopulation meets a first set of criteria relevant to the online academic environment for a grouping of students for a group interaction, the first criteria being particular to the educational environment;

the grouping of students forms n groups within the subpopulation, n being an integer ranging from $0$-$n_i$, where i is an integer up to the total number of students in the subpopulation divided by a number of students desired per group; and, the group interaction includes an activity occurring within each group of the n groups;

forming the n groups for the group interaction with a formation module on a non-transitory computer readable medium, the forming including assembling the n groups from the students in the accepted group; and, proctoring the n groups with an electronic proctor function that includes monitoring each of the group interactions to determine whether all meeting criteria have been met for the group interaction to be considered complete for any member of the group;

wherein, the remote students are assembled for the group interaction systematically through instructions sent to the processor from the filtering engine, and the formation module, the group interaction occurring virtually between students participating at locations remote from other students in the group interaction.

2. The method of claim 1, further comprising monitoring with the electronic proctor function for student attendance in the meeting criteria; and, replacing an absent student in one of the n groups of the subpopulation, the replacing of the absent student done with a replacement engine on a non-transitory computer readable medium, the replacement engine identifying the absent student and a replacement student that meets the first set of criteria.

3. The method of claim 2, wherein, the n groups include a closed group, a first open group, and a second open group, the closed group ready for the group interaction, the first open group having the absent student, and the second open group having the replacement student for the replacing of the absent student of the first open group;

the replacing includes transferring a student of the second open group to replace the absent student of the first open group; and, the remote students are assembled for the group interaction systematically through instructions sent to the processor from the filtering engine, the offering module, and the formation module, the group interaction occurring virtually between students participating at locations remote from other students in the group interaction.

4. The method of claim 1, wherein the method includes a second set of criteria, and the first set of criteria or the second set of criteria includes a peer review rating.

5. The method of claim 1, further comprising structuring the group, the structuring including:

separating students of the subpopulation into a plurality of tiers within a predetermined group structure, the separating including filtering the students of the subpopulation through a second set of criteria relevant to the self-paced, online environment to provide a second output from the filtering engine;

wherein, the separating includes designing the plurality of tiers to include a set of first tier students, each student of which meets criteria within the first set of criteria for a first tier student; and, a set of second tier students, each student of which meets criteria within the second set of criteria for a second tier student.

6. The method of claim 1, wherein the method includes a second set of criteria, the first criteria is a passing grade in a course, and the second set of criteria is a minimum peer review rating.

7. The method of claim 1, wherein the offering further includes forming an opt-out group within the subpopulation, the forming including requesting an opt-out of the offering from each student of the subpopulation, the requesting including confirming the rejection of each respective student of the accepted group of the offer to participate in the group interaction.

8. The method of claim 1, wherein the offering further includes forming an opt-out group within the subpopulation, the forming including requesting an opt-out of the offering from each student of the subpopulation, the requesting including confirming the rejection of each respective student of the accepted group of the offer to participate in the group interaction;

setting a deadline for requesting the acceptance and requesting the opt-out; and, forming a drop-out group within the subpopulation, the forming including separating the subpopulation into a group that has neither accepted nor opted-out of the offer to participate in the group interaction by the deadline.

9. The method of claim 5, wherein the plurality of tiers are structured through the filtering engine to form a desired distribution of students.

10. An electronic proctor system for assembling and monitoring remote students for a group interaction in an online academic environment in which the each student can communicate with their group from a respective remote location, the system comprising:

a processor; and, a memory, the memory including a population database on a non-transitory computer readable medium for storing data on each student of the population, the data used for sorting the population into a subpopulation that meets a first set of criteria;

a filtering engine on a non-transitory computer readable medium and configured for separating the subpopulation from the population using the stored data from the population database, the filtering engine configured with instructions to instruct the processor to filter the subpopulation from the population using the first set of criteria, the first criteria being particular to the educational environment; wherein, the instructions include instructions for identifying students of the subpopulation that meet a first set of criteria relevant to the online academic environment for assembling the group for the group interaction; and, instructions for separating the students of the subpopulation into n groups within the subpopulation, n being an integer ranging from 0-ni, where i is an integer up to the total number of students in the subpopulation divided by a number of students desired per group;

and, a formation module on a non-transitory computer readable medium, the formation module configured for forming the n groups for the group interaction, the forming including assembling the n groups from the students in the accepted group;

wherein, the memory includes instructions for proctoring the n groups with an electronic proctor function that includes monitoring each of the group interactions to determine whether all meeting criteria have been met for the group interaction to be considered complete for any member of the group.

11. The system of claim 10, the system further comprising instructions for monitoring with the electronic proctor function for student attendance in the meeting criteria;

a replacement engine on a non-transitory computer readable medium configured for replacing an absent student in one of the n groups of the subpopulation, the replacement engine identifying the absent student and a replacement student that meets the first set of criteria.

12. The system of claim 11, wherein the n groups include a closed group, a first open group, and a second open group, the closed group ready for the group interaction, the first open group having the absent student, and the second open group having the replacement student for the replacing of the absent student of the first open group;

the replacing includes transferring a student of the second open group to replace the student of the first open group; and, the remote students are assembled for the group interaction systematically through instructions sent to the processor from the filtering engine, the offering module, and the formation module, the group interaction occurring virtually between students participating at locations remote from other students in the group interaction.

13. The system of claim 10, wherein the offering module is further configured with acceptance instructions for instructing the processor to request an acceptance of the offering from each student of the subpopulation that desires to participate in the group interaction.

14. The system of claim 10, wherein the offering module is further configured with opt-out instructions for instructing the processor to request an opt-out of the offering from each student of the subpopulation that does not desire to participate in the group interaction.

15. The system of claim 11, wherein the offering module includes instructions configured for instructing the processor to form one or more of an accepted group having students that accepted the offering;

an opt-out group having students that opted-out of the offering; and, a drop-out group having students that neither accepted nor opted-out of the offering by a deadline;

and, the replacement engine includes instructions configured for instructing the processor to replace a student of the subpopulation that has opted-out or dropped-out of the offering.

16. The system of claim 10, the filtering engine further configured for structuring the group, the structuring including:

separating students of the subpopulation into a plurality of tiers, the separating including filtering the students of the subpopulation through a second set of criteria to provide a second output from the filtering engine; wherein, the plurality of tiers includes a set of first tier students, each of which meet criteria within the second set of criteria for a first tier student; and, a set of second tier students, each of which meet criteria within the second set of criteria for a second tier student.

17. The system of claim 10, wherein the system includes a second set of criteria, the first criteria is a passing grade in a course, and the second set of criteria is a peer review rating.

18. A method of participating as a remote student in a group interaction in an online academic environment, the method comprising:

enrolling in the online academic environment, the environment including the system of claim 10;

participating in the online academic environment to pursue achieving the first set of criteria to become a student of the subpopulation identified by the filtering engine;

receiving the offer to participate in the group interaction, the offer received through the offering module;

participating in the group interaction; and, monitoring group interaction criteria through the electronic proctor function.

19. The method of claim 18, further comprising accepting the offer to participate in the group interaction to become a student of one of the plurality of n groups formed by the formation module.

20. The method of claim 18, the environment including the system of claim 11, and the method further comprising (i) accepting the offer to participate in the group interaction to become a student of an open group in the plurality of n groups formed by the formation module, and (ii) replacing an absent student of a closed group in the plurality of n groups.

* * * * *